US006114958A

United States Patent [19]
Murphy

[11] Patent Number: 6,114,958
[45] Date of Patent: Sep. 5, 2000

[54] SYSTEM AND METHOD FOR INDICATING WHEN A STYLUS OF A COMPUTER IS MISSING

[75] Inventor: Stephen C. Murphy, Meridian, Id.

[73] Assignee: Micron Electronics, Inc., Nampa, Id.

[21] Appl. No.: 09/100,376

[22] Filed: Jun. 19, 1998

[51] Int. Cl.[7] .................................................. G08B 13/14
[52] U.S. Cl. .................................. 340/568.1; 200/61.59; 345/179
[58] Field of Search ................................. 340/568.1, 571, 340/686.4, 529; 200/61.59; 345/179; 178/18.01, 19.01

[56] References Cited

U.S. PATENT DOCUMENTS

| | | |
|---|---|---|
| 1,659,822 | 2/1928 | Innes . |
| 2,194,763 | 3/1940 | Mayer . |
| 2,210,229 | 8/1940 | Boerner . |
| 3,933,381 | 1/1976 | Schurman . |
| 4,153,178 | 5/1979 | Weavers . |
| 4,844,519 | 7/1989 | Dagon . |
| 4,870,405 | 9/1989 | Fletcher ................................ 340/568.1 |
| 4,890,094 | 12/1989 | Kopel ....................................... 340/571 |
| 4,927,986 | 5/1990 | Daly . |
| 4,943,096 | 7/1990 | Looper . |
| 5,067,573 | 11/1991 | Uchida . |
| 5,180,891 | 1/1993 | Trumbo ................................. 178/18.01 |
| 5,200,913 | 4/1993 | Hawkins et al. . |
| 5,401,917 | 3/1995 | Yoshida et al. . |
| 5,422,442 | 6/1995 | Gouda et al. . |
| 5,465,191 | 11/1995 | Nomura et al. . |
| 5,483,262 | 1/1996 | Izutani . |
| 5,576,502 | 11/1996 | Fukushima et al. .............. 178/18.01 X |
| 5,576,929 | 11/1996 | Uchiyama et al. . |
| 5,614,886 | 3/1997 | Snell et al. ........................ 340/568.1 X |
| 5,622,395 | 4/1997 | Shine et al. . |
| 5,635,959 | 6/1997 | Takeuchi et al. ......................... 345/179 |
| 5,703,626 | 12/1997 | Itoh et al. ........................... 345/179 X |
| 5,756,941 | 5/1998 | Snell . |
| 5,898,427 | 4/1999 | Okamoto ................................. 345/179 |

*Primary Examiner*—Thomas Mullen
*Attorney, Agent, or Firm*—Knobbe, Martens Olson & Bear, LLP

[57] ABSTRACT

A system and method for alerting a user of an electronic device such as a computer when a stylus of the computer is not properly inserted into a stylus receiver of the computer after the user has finished using the computer. The system includes: a first switch, coupled to the stylus receiver, which indicates whether the stylus is properly positioned within the stylus receiver; a second switch, coupled to the computer, which indicates when the computer is no longer being used; a detection circuit, coupled to the first and second switches, which detects when the first switch indicates that the stylus is not properly positioned within the stylus receiver and the second switch indicates that the computer is no longer being used; and an alarm circuit, coupled to said detection circuit, for alerting the user if the stylus is not properly positioned within the stylus receiver and the computer is no longer being used. The method includes: detecting whether the stylus is properly positioned within the stylus receiver; detecting whether the computer is no longer being used; and providing an alarm signal if the stylus is not properly positioned within the stylus receiver and the computer is no longer being used.

18 Claims, 6 Drawing Sheets

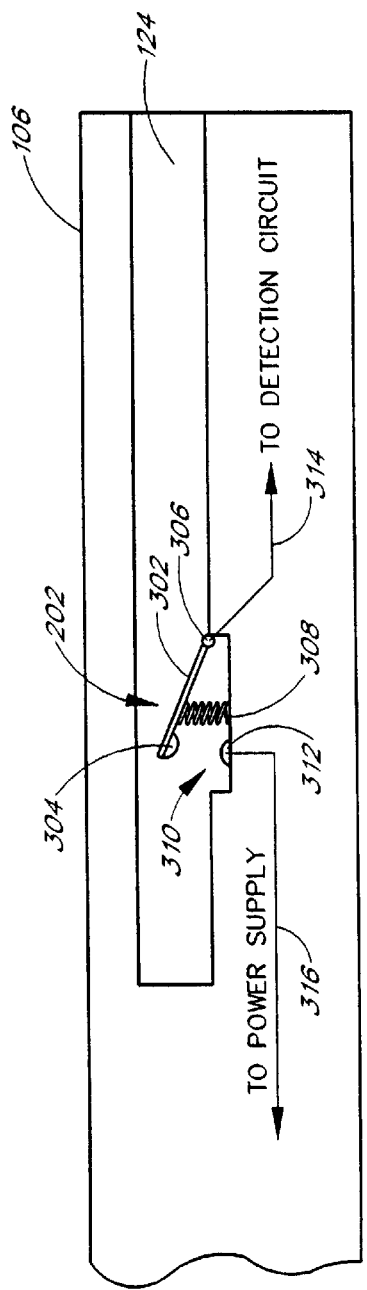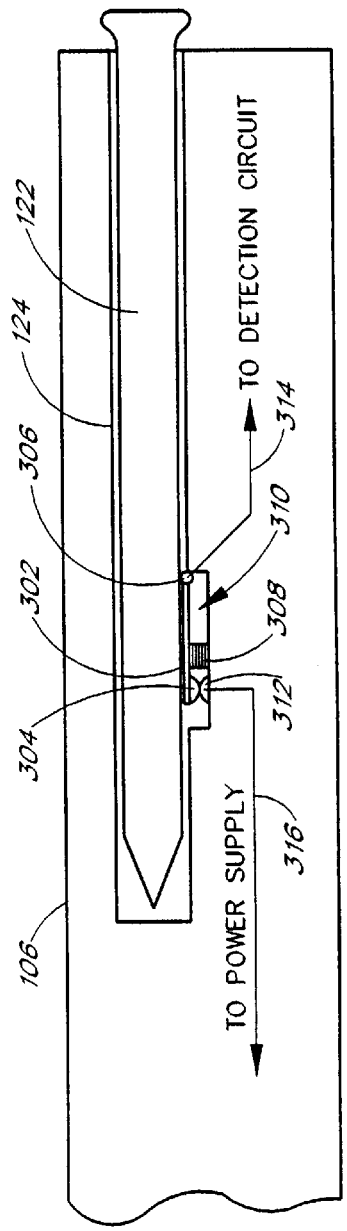

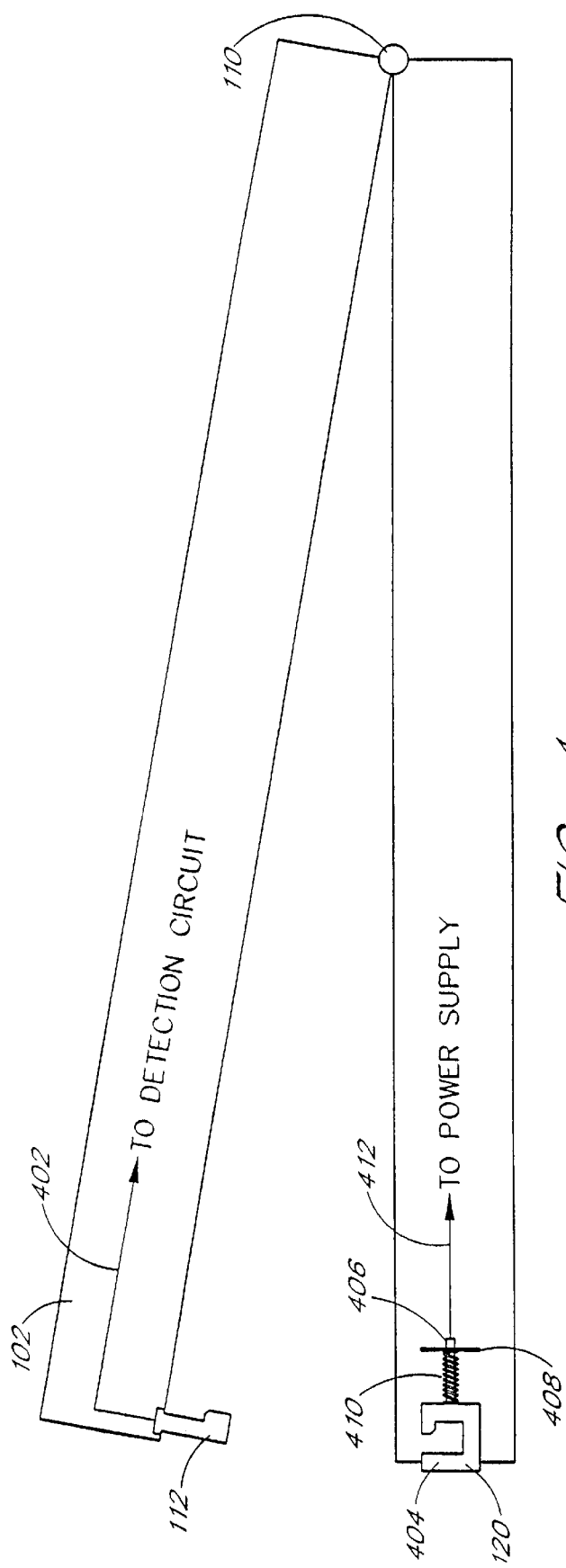
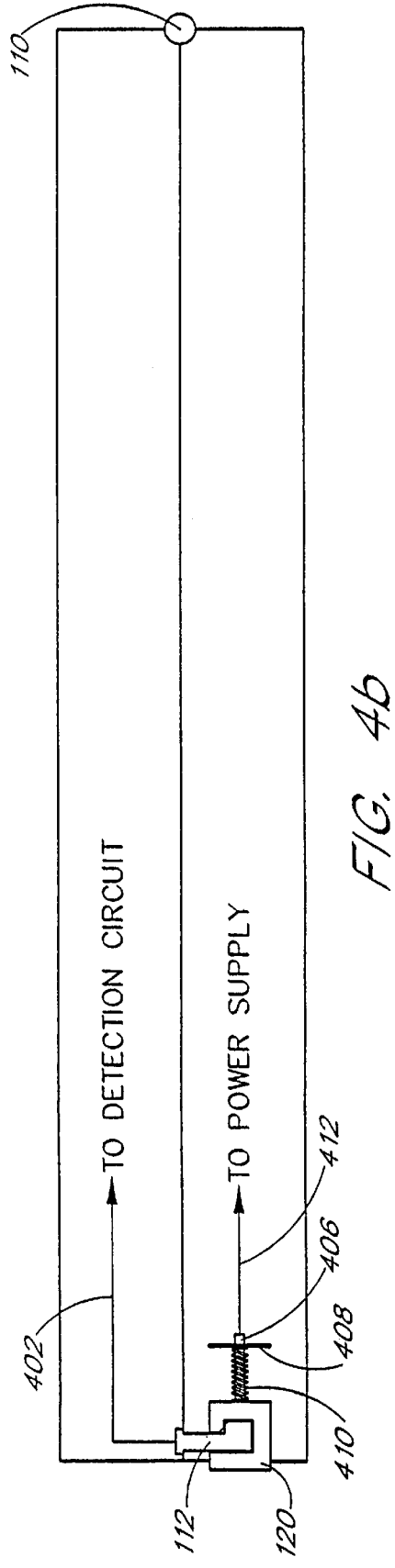

SYSTEM AND METHOD FOR INDICATING WHEN A STYLUS OF A COMPUTER IS MISSING

BACKGROUND OF THE INVENTION

1. Field of the Invention

The invention relates to portable computers and, more particularly, to a method and system for alerting a user of a computer when a stylus is missing from the computer so that the stylus is not easily lost or misplaced.

2. Description of the Related Technology

Many types of electronic devices such as calculators, personal planners, portable, handheld, or "palm-top," computers, for example, which are manufactured today, often use a stylus, otherwise known as a touch pen, in conjunction with a touch sensitive screen, to implement computer operations. For convenience, such devices will be referred to generically herein as "computers." With these computers, a user may select icons displayed on the touch-sensitive screen, for example, by touching the screen at appropriate locations with the stylus. The stylus is typically held within a sleeve, channel, or other type of receiver which is typically located within or adjacent to the housing of the computer. After a user has finished using the stylus, he or she can then insert the stylus into the receiver for safekeeping and turn the computer off.

Unfortunately, as human beings sometimes tend to be forgetful, or become preoccupied or distracted during use of a computer, the stylus of prior art computers often becomes lost, or misplaced. Losing a stylus has become almost as commonplace as losing socks while doing the laundry. Therefore, what is needed is a method and system for preventing the loss of a stylus of an electronic device such as a computer.

SUMMARY OF THE INVENTION

The invention addresses the above and other needs by providing a method and system for providing a warning signal to a user of a computer if a stylus of the computer is not properly placed in a stylus receiver of the computer after the computer has been turned off and/or closed.

In one embodiment of the invention, a system for alerting a user of a computer when a stylus of the computer is not properly inserted into a stylus receiver of the computer after the user has finished using the computer, includes: a first switch, coupled to the stylus receiver, which indicates whether the stylus is properly positioned within the stylus receiver; a second switch, coupled to the computer, which indicates when the computer is no longer being used; a detection circuit, coupled to the first and second switches, which detects when the first switch indicates that the stylus is not properly positioned within the stylus receiver and the second switch indicates that the computer is no longer being used; and an alarm circuit, coupled to said detection circuit, for alerting the user if the stylus is not properly positioned within the stylus receiver and the computer is no longer being used.

In another embodiment, a system for alerting a user of a computer when a stylus of the computer is not properly inserted into a stylus receiver of the computer after the user has finished using the computer, includes: means for detecting when the stylus is not properly positioned within the stylus receiver; means for detecting when the computer is no longer being used; and means responsive to the detecting means for alerting the user if the stylus is not properly positioned within the stylus receiver and the computer is no longer being used.

In a further embodiment, a method of alerting a user of a computer when a stylus of the computer is not properly inserted into a receiver of the computer after the user has finished using the computer, includes: detecting whether the stylus is properly positioned within the stylus receiver; detecting whether the computer is no longer being used; initiating an alarm if the stylus is not properly positioned within the stylus receiver and the computer is no longer being used.

In yet another embodiment, a method of alerting a user of a computer when a stylus of the computer is not properly inserted into a stylus receiver of the computer after the user has finished using the computer, includes: closing a first switch so as to provide electrical connectivity between a power supply and a detection circuit, if the stylus is positioned within the stylus receiver; propagating a first signal from the power supply to a first input of the detection circuit via the first switch when said first switch is in a closed state; opening the first switch so as to disconnect the power supply from the detection circuit, when the stylus is not positioned within the stylus receiver; closing a second switch when a first member of the computer is in a closed position with respect to a second member of the computer; propagating a second signal from said power supply to a second input of the detection circuit via the second switch when said second switch is closed, wherein, when the first signal is not present at the first input and the second signal is present at the second input, the detection circuit determines that the stylus is not properly positioned within the stylus receiver and the computer is no longer being used; and generating an alarm to alert a user of the computer if the detection circuit determines that the stylus is not properly positioned within the stylus receiver and the computer is no longer being used.

In a further embodiment, a method of alerting a user of a computer when a stylus of the computer is not properly inserted into a stylus receiver of the computer after the user has finished using the computer, includes: closing a first switch, coupled to said stylus receiver, to provide electrical connectivity between a power supply of the computer and a first input of a detection circuit of the computer, if the stylus is inserted into the stylus receiver; opening the first switch to electrically disconnect the power supply from the first input of the detection circuit, if the stylus is not inserted into the stylus receiver; connecting the power supply to a second input of the detection circuit when a Power On/Off button of the computer is in the On position; disconnecting the power supply from the second input of the detection circuit when the Power On/Off button is in the Off position, wherein, when the power supply is electrically disconnected from the first and second inputs, the detection circuit determines that the stylus is not properly positioned within the stylus receiver and the computer is no longer being used; and generating an alarm to alert the user of the computer if the detection circuit determines that the stylus is not properly positioned within the stylus receiver and the computer is no longer being used.

In another embodiment, a method of alerting a user of a computer when a stylus of the computer is not properly inserted into a stylus receiver of the computer after the user has finished using the computer, includes: detecting whether the stylus is properly positioned within the stylus receiver; detecting when the computer is no longer being used; generating an alarm if the stylus is not properly positioned within the stylus receiver and the computer is no longer being used.

BRIEF DESCRIPTION OF THE DRAWINGS

FIG. 3a is an elevational, cross-sectional view of a portion of the computer of FIG. 1, taken from a perspective in the direction of lines 3—3 of FIG. 1 at approximately a longitudinal bi-section of a stylus channel of the computer, which shows a first switch, located in the stylus channel, when a stylus is not positioned within the channel.

FIG. 3b is an elevational, cross-sectional view similar to that of FIG. 3a which shows the first switch in a closed state and a stylus positioned within the stylus channel.

FIG. 4a is an elevational, cross-sectional side view of the computer of FIG. 1, taken along the lines 4—4 of FIG. 1, showing the computer in an open position.

FIG. 4b is an elevational, cross-sectional side view of the computer of FIG. 1, taken along the lines 4—4 of FIG. 1, showing the computer in a closed position.

DETAILED DESCRIPTION OF THEN INVENTION

The invention is described in detail below with reference to the figures, wherein like elements are referenced with like numerals throughout.

Figure 1:
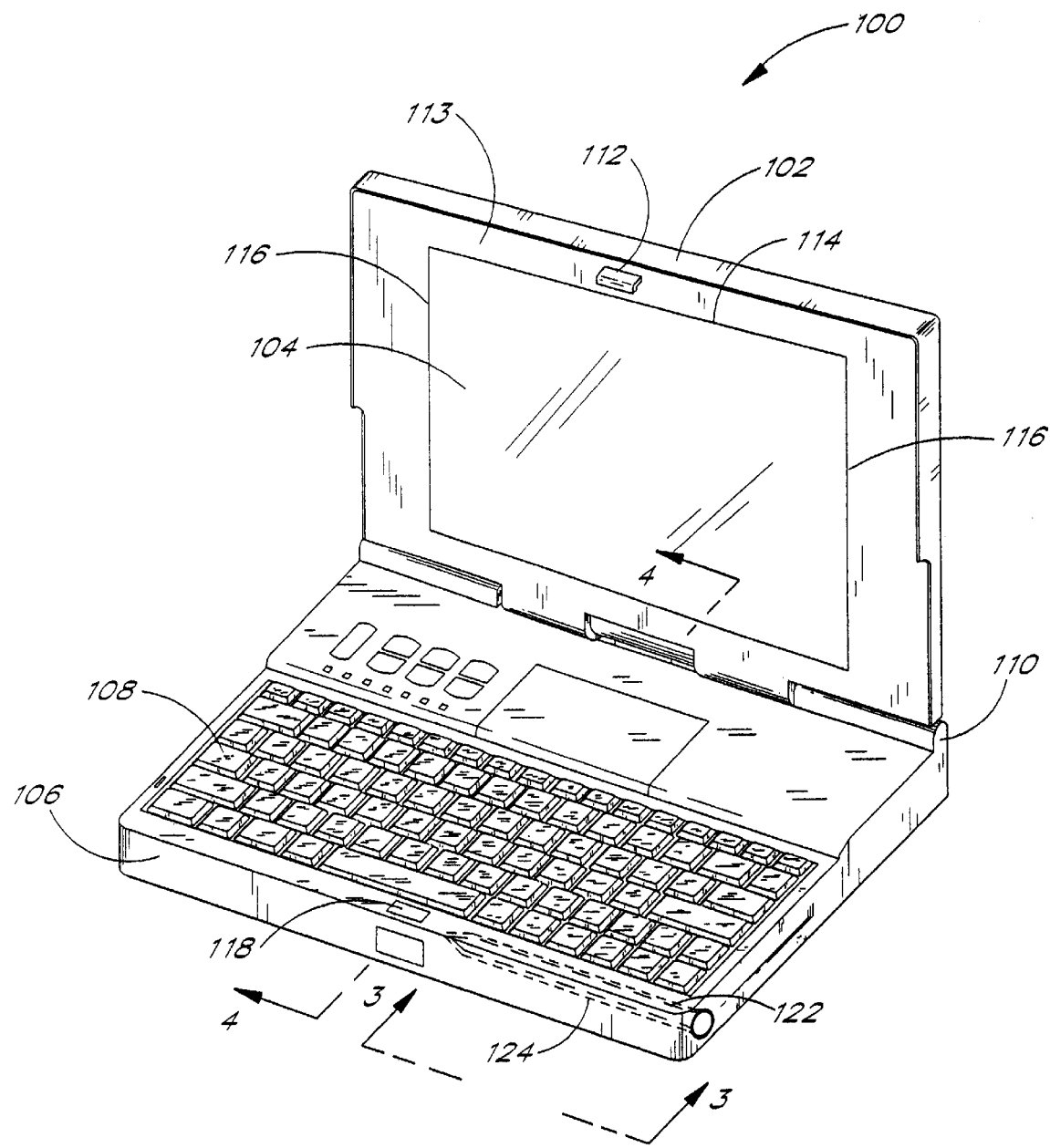
FIG. 1 is a perspective view of a computer having a stylus, a channel for receiving the stylus therein, and a touch-sensitive screen.

Referring to FIG. 1, a perspective view of a computer 100, designed in accordance with one embodiment of the invention, is illustrated. The computer 100 includes a first member or lid 102 which provides a display screen 104 for displaying text, images, and graphical user interface (GUI) data to the operator of the computer 100. The computer 100 further includes a second member or body 106 that provides an alphanumeric keyboard 108 for receiving input from an operator of the computer 100. The first member 102 is coupled to the second member 106 by a hinge 110 that allows the first member 102 to swing away from the second member 106 when the computer is "opened" for use by an operator, and allows the first member 102 to swing toward the second member 106 so as to "close" the computer 100 when it is shut off and not being used by an operator. In one embodiment, the hinge 110 is spring-biased such that the first member 102 automatically swings away from the second member 106 when the first member 102 is not properly latched shut to the second member 106.

To latch the first member 102 shut with respect to the second member 106, the computer 100 includes a latch 112, attached to the first member 102 so as to extend outward from a front surface 113 of the first member 102 on which the display screen 104 is provided. As shown in FIG. 1, the latch 112 is located above a top edge 114 of the display screen 104 at a substantially central position between the two side edges 116 of the display screen 104. When the first member 102 is in a closed position with respect to the second member 106, the latch 112 passes through a latch aperture 118, which is provided on the second member 106 at a position which is in mating alignment with the latch 112 when the first member 102 is in the closed position. The latch 112 engages a latch release 120, and can comprise any of numerous commercial latch mechanisms presently used on electronic devices such as palm top computers. As will be described in further detail below with respect to FIGS. 4a and 4b, in this closed position, the latch 112 interlocks with the latch release 120 to secure the computer in a closed position. The computer 100 further includes a stylus 122 which is received within a stylus receiver, or slot, 124.

As shown in FIG. 1, the stylus receiver 124 extends within the body of the second member 106 at a location behind a front surface of the second member 106 and in an orientation that is parallel to that front surface. However, the channel 124 need not be located and oriented in this position. Depending on the size and shape of the computer 100, the stylus receiver 124 may be located on the first member 102, for example, or run in a direction perpendicular to the channel 124 illustrated in FIG. 3. The location, and orientation, of the stylus receiver 124 may be implemented in any desired configuration allowed by the size, shape and space available within the computer 100.

Figure 2:
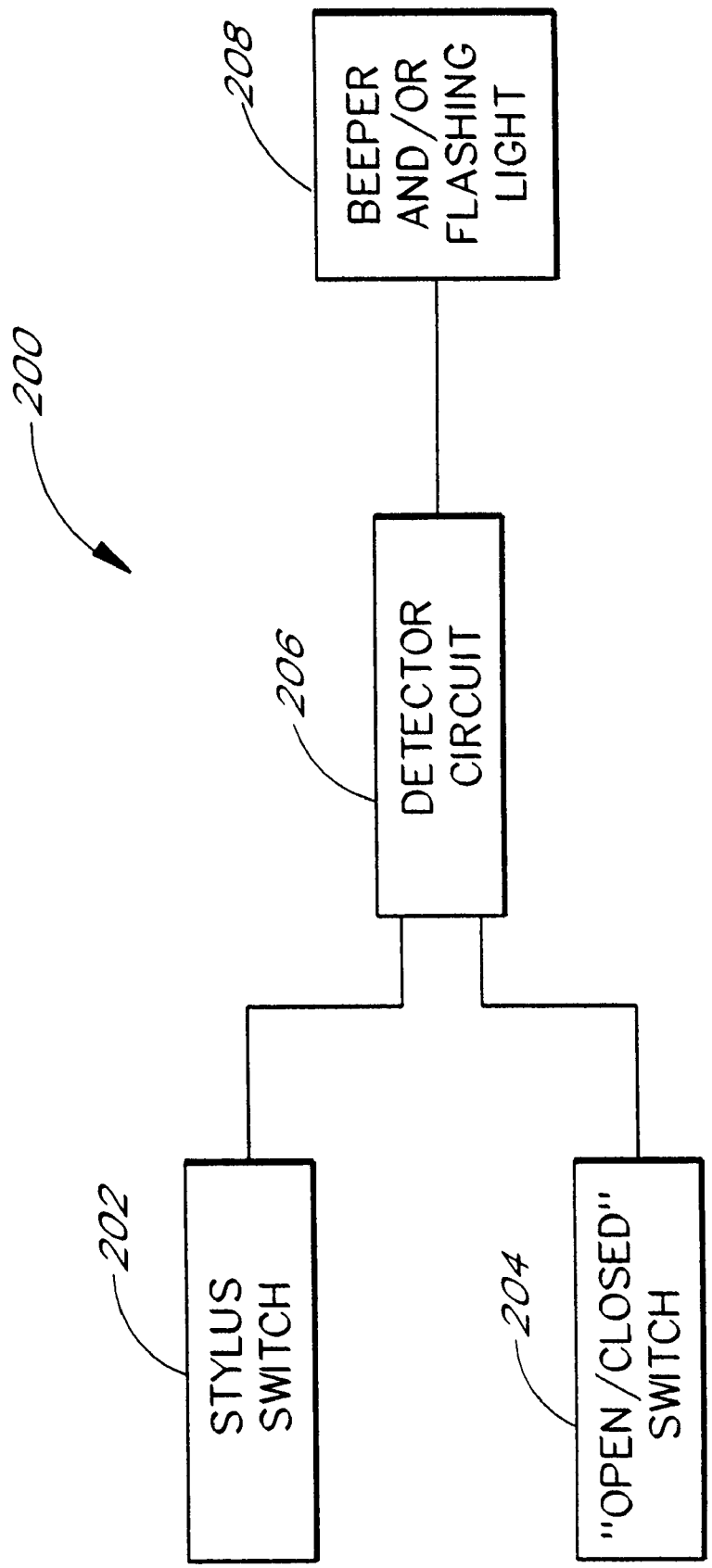
FIG. 2 is a block diagram of a system for determining when a computer is closed but its stylus is not properly inserted in its channel.

FIG. 2 illustrates a block diagram of a system 200 for determining when the computer 100 (FIG. 1) is in a closed position, and the stylus 122 (FIG. 1) is not properly positioned within the stylus receiver 124 (FIG. 1), in accordance with one embodiment of the invention. The system 200 includes a stylus switch 202 for indicating when the stylus 122 (FIG. 1) is positioned within the stylus receiver 124 (FIG. 1) of the computer 100. The system 200 further includes an "open/closed" switch 204 for indicating when the computer 100 is in an open or closed position. The switches 202 and 204 may comprise any of numerous switches and/or sensors which are well-known in the art. For example, these switches may comprise conventional single-pole contact switches or, alternatively, any type of sensor capable of detecting the presence or absence of a physical structure which is well-known in the art. The location and operation of the switches 202 and 204 are described in further detail below with reference to FIGS. 3a–4b.

Both the stylus switch 202 and the open/closed switch 204 are connected to a detection circuit 206. The detection circuit 206 detects when the computer 100 is in a closed position and when the stylus 122 is not properly positioned within the stylus receiver 124. When such a situation occurs, the detection circuit sends a signal to a circuit 208 which produces a humanly perceptible warning such as a beep or audible alarm and/or a flashing light. The circuit 208 may be any commericially available circuit having a miniature speaker, and circuitry for generating audio signals. Alternatively, or additionally, the circuit 208 may have flashing light emitting diodes, for example. Such circuits are well-known in the art and can be seen on a great variety of electronic devices. A more detailed discussion of the functionality of the system 200 is provided below with respect to FIG. 5.

Referring to FIG. 3a, an elevational, cross-sectional view of a portion of the computer 100 of FIG. 1, taken along lines 3—3 of FIG. 1 at approximately a longitudinal bi-section of the stylus receiver 124, is illustrated. As shown in FIG. 3a, a stylus switch 202 is positioned within the stylus receiver 124. The stylus switch 202 includes a lever 302 having a first electrical contact 304 attached to a first end of the lever 302. The lever 302 further includes a hinge 306 coupled to a second end of the lever 302, opposite the first end, about which the lever 302 may rotate. The hinge 306 may be rotatably coupled to an internal wall of the computer 100 by any conventional and well-known method. The lever 302 is spring-biased by a spring 308, located under the lever 302 in a recess 310 and extending between the inner surface of the second member 106 and the lever 302. Thus, accordingly, the first end of the lever 302 is pushed into the stylus receiver 124. Thus, the first contact 304 located at the first end of the lever 302 is spring-biased away from a second contact 312 positioned within the recess 310, below the lever 302 and in mating alignment with the first contact 304.

A first contact lead 314 is electrically connected to the hinge 306 which in turn is electrically connected to the first contact 304 via the lever 302. In one embodiment, the lever 302, the first contact 304 and the hinge 306 are made from an electrically conductive metal such as copper. Therefore, the lever 302 serves as a conductor between the first contact 304 and the hinge 306 such that the first contact lead 314 may be electrically coupled to the first contact 304 by connecting one end of the first contact lead 314 to the hinge 306. Another end of the first contact lead 314 is electrically coupled to a detection circuit (not shown) so as to provide electrical connectivity between the first contact 304 and the detection circuit. A second contact lead 316 is connected to the second contact 312 and provides electrical connectivity between the second contact 312 and a power supply (not shown) of the computer 100 (FIG. 1).

Referring to FIG. 3b, when a stylus 122 is inserted into the stylus receiver 124, the lever 302 is pushed downwardly by the stylus 122 as it is being inserted. In this position, the first contact 304 makes electrical contact with the second contact 312. As shown in FIG. 3b, an electrical conduction path is established between a power supply (not shown) and a detection circuit (not shown) via the second contact lead 316, the second contact 312, the first contact 304, the lever 302, the hinge 306 and the first contact lead 314. Therefore, a voltage, or current, from the power supply may be transferred to the detection circuit to indicate that the stylus 122 is present in the stylus receiver 124.

FIG. 4a illustrates an elevational, cross-sectional view of the computer 100 of FIG. 1, taken along lines 4—4 of FIG. 1, when the computer 100 is in an open position. In this position, the first member 102 (FIG. 1) is rotated away from the second member 106 (FIG. 1). Both the first and second members 102 and 106, respectively, rotate about the hinge 110 (FIG. 1).

In one embodiment, the open/closed switch 204 (FIG. 2) includes, as a first contact element, the latch 112 (FIG. 1) which is connected to the first member 102 of the computer 100. As shown in FIG. 4a, the latch 112 is electrically connected to a third contact lead 402 which electrically connects the latch 112 to a detection circuit (not shown) within the computer 100. The open/closed switch 204 further includes, as a second contact element, the latch release 120 (FIG. 1) which is coupled to the second member 106 of the computer 100. The latch release 120 includes a hook portion 404 which is configured to engage and interlock with the latch 112 when the computer 100 is in the closed position. The latch release 120 further includes a contact rod 406 which extends outwardly (toward the right as shown in FIG. 4a) from a rear portion of the latch release 120. The contact rod 406 extends through a hole (not shown) of a biasing wall 408 which is attached to an inner portion of the housing of the second member 106. A biasing spring 410 is coiled around the contact rod 406 and is configured to be compressed between the rear surface of the latch release 120 and a front surface of the biasing wall 408, when the latch release 120 is pressed inwardly (toward the right as shown in FIG. 4a) to disengage the latch 112.

The biasing spring 410 biases the latch release 120 outwardly (toward the left as shown in FIG. 4a) away from the biasing wall 408 such that when the latch 112 engages the latch release 120, the biasing spring 410 pushes the latch release 120 toward the latch 112 so as to hold the latch release 120 and the latch 112 in an interlocked position. In order to disengage the latch 112 from the latch release 120, an operator must push the latch release 120 inwardly toward the biasing wall 408, compressing the biasing spring 410, so as to push the hook portion 404 of the latch release 120 away from the latch 112.

Electrically coupled to the contact rod 406 is a fourth contact lead 412, which in turn is electrically connected to a power supply (not shown) within the computer 100. In one embodiment, at least a portion of the contact rod 406 is in electrical contact with a portion of the latch release 120 such that there is electrical connectivity between the fourth contact lead 412 and the latch release 120 through the contact rod 406. As described in further detail below with respect to FIG. 4b, when the latch 112 engages and interlocks with the latch release 120, at least a portion of the latch 112 makes electrical contact with at least a portion of the latch release 120 such that an electrical conduction path is established between the power supply and the detection circuit within the computer 100.

Referring to FIG. 4b, when the first member 102 (FIG. 1) of the computer 100 is brought together with the second member 106 (FIG. 1) so as to close the computer 100, the latch 112 interlocks with the latch release 120, as described above. In this position, the first member 102 is rotated about the hinge 110 toward the second member 106 such that the first member 102 and the second member 106 come together to enclose the computer 100. In this closed position, the latch 112 passes through the latch aperture 118 (FIG. 1) and engages and interlocks with the hook portion 404 of the latch release 120. In one embodiment, the latch 112 and latch release 120 are made from an electrically conductive material such as copper so as to provide an electrical conduction path between elements connected to the latch 112 and latch release 120. In this way, the connection between the latch 112 and the latch release 120 establishes an electrical conduction path between the power supply and the detection circuit. This conduction path consists of the third contact lead 402, the latch 112, the latch release 120, the contact rod 406 and the fourth contact lead 412. Therefore, a voltage, or current, from the power supply may be transferred to the detection circuit to indicate that the first member 102 has been latch closed with respect to the second member 106.

As described above, in one embodiment, the first member 102 is spring-biased by means of the hinge 110 to move away from the second member 106 when the latch 112 is not interlocked with the latch release 120. The latch 112 may be released from the latch release 120 by pressing the latch release 120 inwardly, toward the right as shown in FIGS. 4a and 4b. This compresses the spring 410 and disengages the hook portion 404 of the latch release 120 from the hook portion of the latch 112. When the latch 112 is released, the first member 102 automatically swings upwardly and away from the second member 106 because of the spring-biased hinge 110. Although in the embodiment described above, the latch 112 and latch release 120 perform a double duty of latching the first member 102 to the second member 106 and functioning as the open/closed switch 204 (FIG. 2), in other embodiments, it is contemplated that the open/closed switch 204 may be a separate switch which is independent of the latch 112 and latch release 120.

Figure 5:
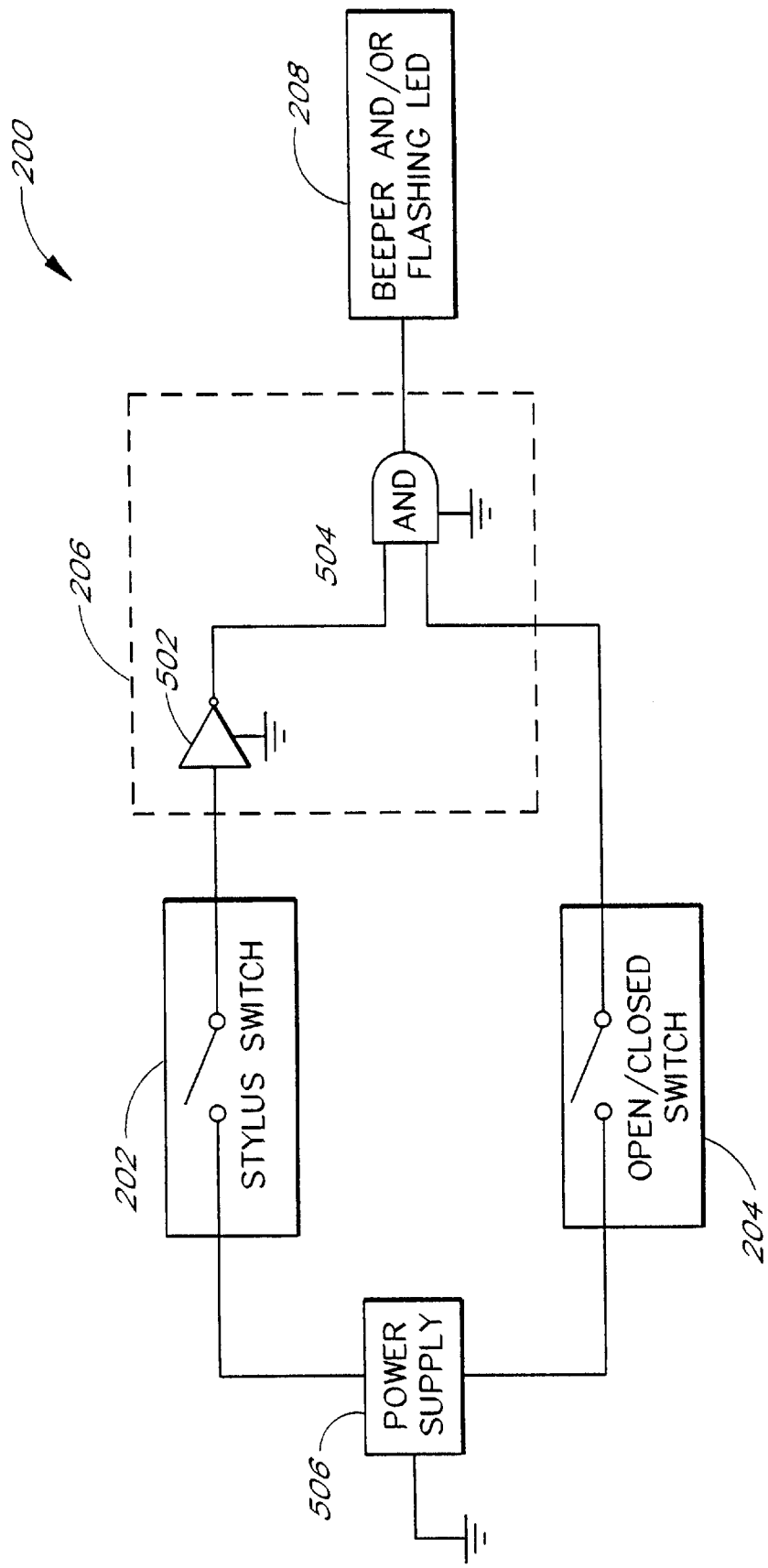
FIG. 5 is a logic block diagram of a circuit which detects when the computer of FIG. 1 is in a closed state, and when the stylus of the computer is not positioned within the stylus receiver of the computer.

Referring to FIG. 5, one embodiment of a system 200 for indicating when a stylus is missing, is illustrated. The system includes a detection circuit 206 which includes an inverter 502 having an input coupled to the stylus switch 202 (FIGS. 3a and 3b). The detection circuit 206 further includes an AND gate 504 having a first input coupled to an output of the inverter 502. A second input of the AND gate 504 is coupled to the open/closed switch 204. In one embodiment, the switch 204 comprises the latch 112 and latch release 120 (FIGS. 4a and 4b). As shown in FIG. 5, a power supply 506 is coupled to both the stylus switch 202 and the open/closed switch 204. This power supply may be a main battery within the computer 100 which supplies power to operate the computer 100, or alternatively, an auxiliary power source that has as one of its main functions, the task of supplying power to the detection circuit 206. Depending on the voltages and/or currents desired, the output of the power supply 506 may be adjusted by appropriate resistor divider circuits, or any other means for adjusting the output voltage/current levels of a power source, which is well-known in the electrical arts.

As described above with respect to FIGS. 3a and 3b, when a stylus 122 (FIGS. 1 and 3) is inserted into the stylus receiver 124 (FIGS. 1 and 3), the stylus switch 202 is moved to a closed position, thereby providing an electrical connection between the power supply 506 and a first input of the detection circuit 206. In this state, a first high-level voltage (e.g., 5 volts) from the power supply 506 is applied across the stylus switch 202 to the input of the inverter 502. The inverter 502 inverts this high-level voltage and outputs a first low-level voltage (e.g., 0.5 volts). This low-level voltage is then applied at the first input of the AND gate 504. When the stylus 122 is not positioned within the stylus receiver 124, the stylus switch 202 is in an open position, and the power supply 506 is disconnected from the detection circuit 206. Therefore, in this state, approximately zero volts is present at the input of the inverter 502. The invertor 502 inverts this low-level voltage into a high-level voltage (e.g., 5 volts), which is applied to the first input of the AND gate 504.

As described above with respect to FIGS. 4a and 4b, when the first member 102 (FIG. 1) of the computer 100 (FIG. 1) is in an open position with respect to the second member 106 (FIG. 1) of the computer 100, the open/closed switch 204 is in an open state. In this state the power supply 506 is disconnected from the second input of the AND gate 504. Therefore, there is no voltage applied to the second input of the AND gate 504 and the AND gate 504 "sees" a low-level voltage at its second input. When the first member 102 is in a closed position with respect to the second member 106, the open/closed switch 204 is in a closed state and provides an electrical conduction path between the power supply 506 and the second input of the AND gate 504. In this state, the power supply 506 applies a high-level voltage (e.g., 5 volts) to the second input of the AND gate 504.

When the stylus 122 is not positioned within the stylus receiver 124, a high-level voltage is applied to the first input of the AND gate 504. Additionally, when the first member 102 of the computer 100 is in a closed position with respect to the second member 106, a high-level voltage is applied to the second input of the AND gate 504. When a high-level voltage is present at both the first and second inputs of the AND gate 504, the output of the AND gate will also be a high-level voltage. As shown in FIG. the output of the AND gate 504 is coupled to a Beeper and/or Flashing Light circuit 208. In one embodiment, when the circuit 208 receives a high-level voltage from the output of the AND gate 504, it produces an auditory beeping sound and/or illuminates one or more flashing lights (e.g., light emitting diodes) on the computer 100.

The operation, design and functionality of inverters and AND gates are well-known in the art. The inverter 502 and the AND gate 504 may be any inverter and AND gate, respectively, which is commercially available. As discussed above, the Beeper and/or Flashing Light circuit 208, are also well known in prior art electronic applications.

Figure 6:
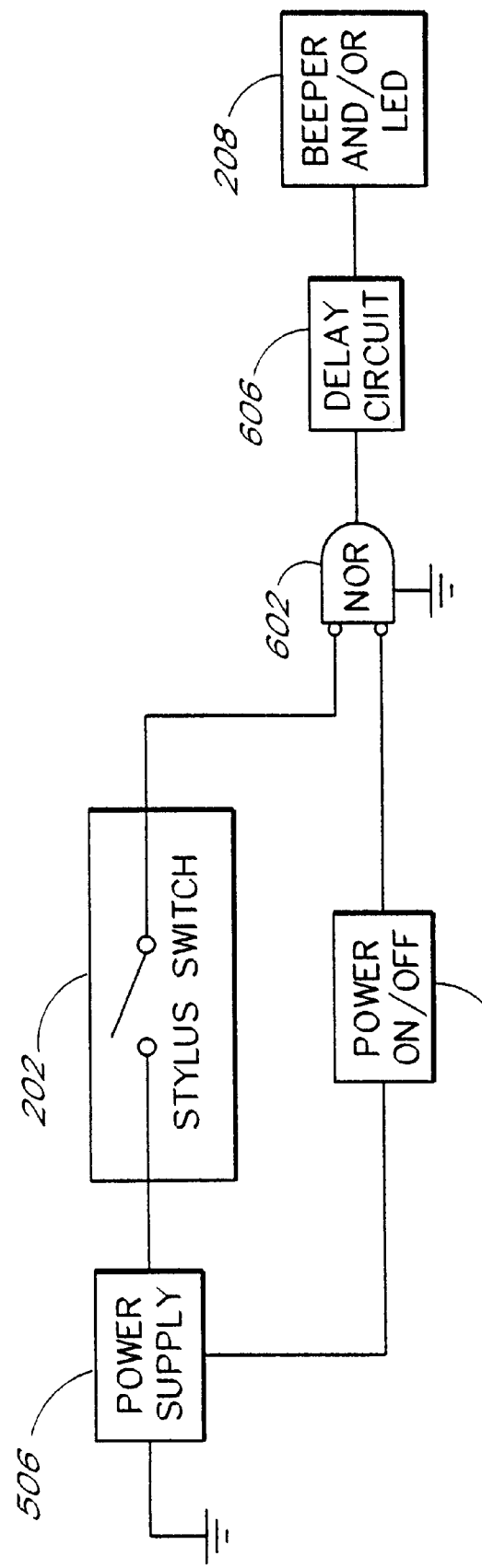
FIG. 6 is a logic block diagram of a circuit which detects when the computer of FIG. 1 is turned off and the stylus of the computer is not positioned within the stylus receiver of the computer.

Referring to FIG. 6, another embodiment of a system 200 for indicating when a stylus is missing, is illustrated. The system 200 includes a NOR gate 602 which functions as a detection circuit 206 (FIG. 2). A first input of the NOR gate 602 is coupled to the stylus switch 202. A second input of the NOR gate 602 is coupled to a Power On/Off switch 604 of the computer 100 which is used to turn the computer 100 on and off. As shown in FIG. 6, a power supply 506 is coupled to both the stylus switch 202 and the Power On/Off switch 604. This power supply may be the main battery within the computer 100 which supplies power to operate the computer 100. Depending on the voltages and/or currents desired, the output of the power supply 506 may be adjusted by appropriate resistor divider circuits, or any other means for adjusting the output voltage/current levels of a power source, which is well-known in the electrical arts.

When a stylus 122 (FIGS. 1 and 3) is inserted into the stylus receiver 124 (FIGS. 1 and 3), the stylus switch 202 is moved into a closed position, thereby providing an electrical connection between the power supply 506 and the first input of the NOR gate 602. In this state, a first high-level voltage (e.g., 5 volts) from the power supply 506 is applied across the stylus switch 202 to the first input of the NOR gate 602. When the stylus 122 is not positioned within the stylus receiver 124, the stylus switch 202 is in an open position, thereby disconnecting the power supply 506 from the first input of the NOR gate 602. Therefore, in this state, approximately zero volts will be present at the first input of the NOR gate 602.

When a user is operating the computer 100, the Power On/Off switch 604 is in an "On" position. In this state, a high-level voltage is applied to the second input of the NOR gate 602. When a user has finished using the computer 100, he or she will switch the Power On/Off switch 604 to an "Off" position. In this state, power from the power supply 506 is disconnected from the second input of the NOR gate 602.

When a stylus 122 is not properly positioned within the stylus receiver 124 and when the Power On/Off switch 604 is in the "Off" position, both the first and second inputs of the NOR gate 602 will have a low-level voltage applied to them. As anyone of ordinary skill in the arts knows, in this state, the output of the NOR gate 602 will be a high-level voltage. In one embodiment, the output of the NOR gate 602 is coupled to a delay circuit 606 which, upon receiving a high-level voltage from the NOR gate 602, initiates a countdown (e.g., 5 seconds) before transmitting the high-level voltage to the Beeper and/or LED circuit 208. The delay circuit 606 may be any conventional, commercially available circuit which is well-known in the electronics field for providing a specified delay in transmitting a signal between two electronic circuits. When the circuit 208 receives a high-level voltage, it produces an auditory beeping sound and/or illuminates one or more lights (e.g., light emitting diodes) on the computer 100. As described above, the alarm circuit 208 may be similar or identical to any wellknown circuit capable of producing audio sounds and/or illuminating light emitting diodes. The NOR gate 602 may be any commercially available NOR gate which is well-known in the art.

Although specific logic circuits have been described above, it should be understood that the invention is not limited to any particular type of logic circuitry. Any combination of switches and logic devices (e.g., AND, NOR, OR, NAND gates, inverters, etc.) and/or analog circuitry may be implemented to provide a detection circuit for determining a condition in which the stylus 122 is not properly seated within the stylus receiver 124 and the computer 100 is in a closed position, or a condition in which the stylus 122 is not properly seated within the stylus receiver 124 and the Power On/Off button 604 of the computer 100 is in the "Off"position.

As described above, the invention provides a method and system for assisting a user/owner of a computer 100 to avoid losing the stylus 122 of the computer 100. By providing a warning signal to the user that indicates when the stylus 122 is not properly positioned within a stylus receiver 124 of the computer 100, after the computer 100 has been turned off and/or closed, the likelihood that the user of the computer 100 will inadvertently lose the stylus, or leave it behind after he or she has finished using it, is significantly reduced. The user is reminded after every session with the computer 100 to place the stylus 120 into the stylus receiver 122. It is contemplated that this reminder will impart upon the user the importance of properly placing the stylus 122 back into the stylus receiver 124 after each use, thereby significantly reducing the possibility that the stylus 122 is lost due to inadvertent misplacement. In this way, the method and system of the invention provides a safeguard against losing the stylus 122.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A system for alerting a user of a computer when a stylus of the computer is not properly inserted into a stylus receiver of the computer after the user has finished using the computer, comprising:
    a switch, coupled to the stylus receiver, which indicates whether the stylus is properly positioned within the stylus receiver;
    a latch, coupled to a first member of the computer;
    a latch release, coupled to a second member of the computer so as to contact said latch when the first member is in a closed position with respect to the second member;
    a detection circuit, coupled to the switch and to the latch and latch release, which detects when the switch indicates that the stylus is not properly positioned within the stylus receiver and the latch and latch release are in contact; and
    an alarm circuit, coupled to said detection circuit, for alerting the user if the stylus is not properly positioned within the stylus receiver and the latch and latch release are in contact.

2. The system of claim 1 wherein, when said latch release is in contact with said latch, an electrical connection is established between a power supply of the computer and said detection circuit.

3. The system of claim 2 wherein said detection circuit comprises:
    an inverter, having an input coupled to said first switch, and an output; and
    an AND gate having a first input coupled to the output of the inverter, a second input coupled to said second switch, and an output coupled to said alarm circuit.

4. The system of claim 1 wherein said alarm circuit comprises an audio speaker for generating an alarm sound to alert said user.

5. The system of claim 1 wherein said alarm circuit comprises a light source which illuminates to alert said user.

6. A system for alerting a user of a computer when a stylus of the computer is not properly inserted into a stylus receiver of the computer after the user has finished using the computer, comprising:
    first means for detecting when the stylus is not properly positioned within the stylus receiver;
    means for latching a first member of the computer in a closed position with respect to a second member of the computer;
    second means for detecting when the first member is latched in a closed position with respect to the second member; and
    means responsive to the first and second detecting means for alerting the user if the stylus is not properly positioned within the stylus receiver and the first member is latched in a closed position with respect to the second member.

7. The system of claim 6 wherein said second means for detecting comprises means for providing electrical connectivity between a power supply of the computer and said second means for detecting.

8. The system of claim 6 wherein said means for alerting comprises means for generating an alarm sound to alert said user.

9. The system of claim 6 wherein said means for alerting comprises means for illuminating at least one light to alert said user.

10. A method of alerting a user of a computer when a stylus of the computer is not properly inserted into a stylus receiver of the computer after the user has finished using the computer, comprising:
    detecting whether the stylus is properly positioned within the stylus receiver;
    detecting whether a latch, coupled to a first member of the computer, is in contact with a latch release, coupled to a second member of the computer, so as to indicate that the first member is in a closed position with respect to the second member; and
    initiating an alarm if the stylus is not properly positioned within the stylus receiver and the latch is in contact with the latch release.

11. The method of claim 10 wherein, when the latch is in contact with the latch release, an electrical connection is established between a power supply of the computer and a detection circuit which detects when the stylus is not properly positioned within the stylus receiver and when the computer is no longer being used.

12. The method of claim 11 wherein:
    said act of detecting whether the stylus is properly positioned within the stylus receiver comprises:
        closing a first switch, coupled to said stylus receiver, to provide electrical connectivity between said power supply and a first input of said detection circuit, if said stylus is inserted into said stylus receiver;
        opening the first switch to electrically disconnect the power supply from the first input of the detection circuit, when the stylus is removed from the stylus receiver; and said act of detecting whether the latch is in contact with the latch release comprises:

connecting the power supply to a second input of the detection circuit when said latch makes contact with said latch release, wherein, when the power supply is disconnected from the first input and connected to the second input, the detection circuit determines that the stylus is not properly positioned within the stylus receiver and the computer is no longer being used.

13. The method of claim 10 wherein said act of initiating an alarm comprises generating an audio warning signal.

14. The method of claim 10 wherein said act of initiating an alarm comprises illuminating a warning light which is attached to said computer.

15. A method of alerting a user of a computer when a stylus of the computer is not properly inserted into a stylus receiver of the computer after the user has finished using the computer, comprising:

closing a first switch so as to provide electrical connectivity between a power supply and a detection circuit, if the stylus is positioned within the stylus receiver;

propagating a first signal from the power supply to a first input of the detection circuit via the first switch when said first switch is in a closed state;

opening the first switch so as to disconnect the power supply from the detection circuit, when the stylus is not positioned within the stylus receiver;

closing a second switch when a latch coupled to a first member of the computer is engaged with a latch release coupled to a second member of the computer, indicating that the first member is in a closed position with respect to the second member;

propagating a second signal from said power supply to a second input of the detection circuit via the second switch when said second switch is closed, wherein, when the first signal is not present at the first input and the second signal is present at the second input, the detection circuit determines that the stylus is not properly positioned within the stylus receiver and the computer is no longer being used; and generating an alarm to alert a user of the computer if the detection circuit determines that the stylus is not properly positioned within the stylus receiver and the computer is no longer being used.

16. A method of alerting a user of a computer when a stylus of the computer is not properly inserted into a stylus receiver of the computer after the user has finished using the computer, comprising:

detecting whether the stylus is properly positioned within the stylus receiver;

determining if a latch, coupled to a first member of the computer, is in electrical contact with a latch release, coupled to a second member of the computer, so as to indicate that the first member of the computer is in a closed position with respect to the second member of the computer; and generating an alarm if the stylus is not properly positioned within the stylus receiver and the latch is in electrical contact with the latch release.

17. The method of claim 16 wherein said act of generating an alarm comprises generating an alarm sound to alert said user.

18. The method of claim 16 wherein said act of generating an alarm comprises illuminating at least one light source coupled to said computer so as to alert said user.

* * * * *

UNITED STATES PATENT AND TRADEMARK OFFICE
CERTIFICATE OF CORRECTION

PATENT NO.   : 6,114,958
DATED        : September 5, 2000
INVENTOR(S)  : Stephen C. Murphy It is certified that error appears in the above-identified patent and that said Letters Patent is hereby corrected as shown below:

Column 7,
Line 61, change "in the Fig. the" to -- in Figure 5, the --.

Signed and Sealed this

Twenty-sixth Day of March, 2002

Attest:

Attesting Officer

JAMES E. ROGAN
Director of the United States Patent and Trademark Office